United States Patent
Chen et al.

(10) Patent No.: US 9,832,822 B2
(45) Date of Patent: Nov. 28, 2017

(54) LINE VOLTAGE COMPENSATION AC LED DRIVING DEVICE

(71) Applicant: SHENZHEN SENDIS GREEN POWER INTEGRATIONS TECHNOLOGY CORPORATION, Shenzhen (CN)

(72) Inventors: Xiaoyu Chen, Shenzhen (CN); Bo Chen, Shenzhen (CN); Xunsheng Deng, Shenzhen (CN); Yanquan Mai, Shenzhen (CN); Hengyou Chen, Shenzhen (CN)

(73) Assignee: SHENZHEN SENDIS GREEN POWER INTEGRATIONS TECHNOLOGY CORPORATION, Shenzhen (CN)

( * ) Notice: Subject to any disclaimer, the term of this patent is extended or adjusted under 35 U.S.C. 154(b) by 0 days.

(21) Appl. No.: 15/106,726

(22) PCT Filed: Dec. 11, 2014

(86) PCT No.: PCT/CN2014/093591
§ 371 (c)(1),
(2) Date: Jun. 20, 2016

(87) PCT Pub. No.: WO2015/101154
PCT Pub. Date: Jul. 9, 2015

(65) Prior Publication Data
US 2017/0034882 A1    Feb. 2, 2017

(30) Foreign Application Priority Data

Dec. 30, 2013 (CN) .......................... 2013 1 0742304

(51) Int. Cl.
*H05B 37/02* (2006.01)
*H05B 33/08* (2006.01)

(52) U.S. Cl.
CPC ....... *H05B 33/0812* (2013.01); *H05B 33/083* (2013.01); *H05B 33/0809* (2013.01);
(Continued)

(58) Field of Classification Search
CPC .................................................. H05B 33/0803
(Continued)

(56) References Cited

U.S. PATENT DOCUMENTS 5,194,782 A * 3/1993 Richardson ........ H05B 41/3925
315/194
8,581,498 B1 * 11/2013 Cheung .............. H05B 33/0815
315/119

(Continued)

FOREIGN PATENT DOCUMENTS

CN    102195469 A    9/2011
CN    103763817 A    4/2014
(Continued)

OTHER PUBLICATIONS

The World Intellectual Property Organization (WIPO) International Search Report for PCT/CN2014/093591 dated Mar. 18, 2015.

*Primary Examiner* — Thuy Vinh Tran
(74) *Attorney, Agent, or Firm* — Anova Law Group, PLLC

(57) ABSTRACT

Disclosed is a line voltage compensation AC LED driving device. The line voltage compensation AC LED driving device comprises a line voltage compensation module and an AC LED driving module. The line voltage compensation module detects an output voltage of a rectifier bridge, and outputs a corresponding line voltage compensation reference voltage to the AC LED driving module according to the change of the output voltage of the rectifier bridge, and the AC LED driving module adjusts a driving current in real time according to the line voltage compensation reference
(Continued)

voltage to keep the output power unchanged. In the present invention, the line voltage compensation module detects the output voltage of the rectifier bridge, and outputs the corresponding line voltage compensation reference voltage to the AC LED driving module according to the change of the output voltage of the rectifier bridge, and the AC LED driving module adjusts the driving current in real time according to the line voltage compensation reference voltage to keep the output power unchanged, and therefore the output luminous flux of a lamp can be basically unchanged, the luminance of the LED lamp is stable, and the voltage flicker of the LED lamp is eliminated.

5 Claims, 2 Drawing Sheets

(52) U.S. Cl.
CPC ..... *H05B 33/0845* (2013.01); *H05B 33/0803* (2013.01); *Y02B 20/348* (2013.01)

(58) Field of Classification Search
USPC ...................................... 315/185 R, 291, 308
See application file for complete search history.

(56) References Cited

U.S. PATENT DOCUMENTS

| | | | |
|---|---|---|---|
| 8,773,046 B2* | 7/2014 | Lee .................... | H05B 33/0815 315/185 R |
| 8,803,439 B2* | 8/2014 | Stamm ............... | H05B 33/0815 315/291 |
| 2011/0140616 A1* | 6/2011 | Yan .................... | H05B 33/0815 315/186 |
| 2012/0217890 A1* | 8/2012 | Chang ................ | H05B 33/0815 315/224 |

FOREIGN PATENT DOCUMENTS

| | | |
|---|---|---|
| CN | 103066867 U | 7/2014 |
| CN | 203691702 U | 7/2014 |

* cited by examiner

LINE VOLTAGE COMPENSATION AC LED DRIVING DEVICE

CROSS-REFERENCES TO RELATED APPLICATIONS

This application is a national stage application of PCT Patent Application No. PCT/CN2014/093591, filed on Dec. 11, 2014, which claims priority to Chinese Patent Application No. 2013107423040, filed on Dec. 30, 2013, the content of all of which is incorporated herein by reference.

FIELD OF THE INVENTION

The present invention relates to the field of electronic devices, and more particularly, to a line voltage compensation AC LED driving device.

BACKGROUND

Currently, LED (Light-Emitting Diode) lamps have been very commonly used in illumination areas, and AC LED driving chips have been more widely applied among all LED lamps. In the prior arts of segmented AC LED driving chips, the output power may fluctuate following the fluctuations of line voltages, same as the output luminous flux. In the cases of any high-power electric devices being frequently turned on and off, the voltage of supplied power may have a certain fluctuations in very small ranges, which may cause flickers of AC LED lamps, and induce discomfort to human eyes. Therefore, the current driving technologies for AC LEDs still have defects, and require more improvements and innovations.

BRIEF SUMMARY OF THE DISCLOSURE

According to above mentioned defects in the prior arts, the purpose of the present invention is providing a line voltage compensation AC LED driving device, adopting a line voltage compensation technology to adjust the driving currents of AC LED driving modules, which is able to keep the luminous flux of the LED lamp almost unchanged.

In order to achieve the above mentioned purposes, the following technology protocols are adopted in the present invention:

A line voltage compensation AC LED driving device, connected in series between a rectifier bridge and an LED lights group, comprises a line voltage compensation module and an AC LED driving module, the line voltage compensation module detects a voltage output from the said rectifier bridge, before outputting a corresponding line voltage compensation reference voltage to the AC LED driving module, while the AC LED driving module adjusts a driving current in a real time basis, according to the line voltage compensation reference voltage, and keeps an output power unchanged.

The line voltage compensation AC LED driving device, wherein, the line voltage compensation module includes a voltage divider module, a reference voltage output module, a peaks sampling module and a subtract module; the voltage divider module outputs a voltage to the peaks sampling module after dividing the voltage output from the rectifier bridge, and the peaks sampling module takes voltage samples and outputs to the subtract module, while the subtract module executes subtract calculations between a sampling voltage output from the peaks sampling module and a reference voltage output from the reference voltage output module, before outputting the line voltage compensation reference voltage.

The line voltage compensation AC LED driving device, wherein, the voltage divider module includes a first resistor and a second resistor, one end of the first resistor connects to the rectifier bridge, and the other end connects to both the peaks sampling module and one end of the second resistor, while the other end of the second resistor gets grounded.

The line voltage compensation AC LED driving device, wherein, it further includes a charging/discharging module, applied to store the peak voltage output from the peaks sampling module, and release the stored electric energy before the next rectifier cycle coming.

The line voltage compensation AC LED driving device, wherein, the charging/discharging module includes a first capacitor and a third resistor, one end of the first capacitor connects to both the peaks sampling module and the subtract module, and the other end gets grounded; the third resistor connects to both ends of the first capacitor in parallel.

Comparing to the prior arts, the line voltage compensation AC LED driving device as provided in the present invention, detects the output voltage of the rectifier bridge through the line voltage compensation module, and outputs the corresponding line voltage compensation reference voltage to the AC LED driving module according to the changes of the output voltage of the rectifier bridge, and the AC LED driving module adjusts the driving current in real time according to line voltage compensation reference voltage to keep the output power unchanged, and therefore the output luminous flux of a lamp can be basically unchanged, the luminance of the LED lamp is stable, and the voltage flicker of the LED lamp is eliminated.

DETAILED DESCRIPTION OF EMBODIMENTS

The present invention provides a line voltage compensation AC LED driving device, by adopting a line voltage compensation technology, it is able to adjust a driving current when voltage of the supplied power has some fluctuations, and keep the output power almost unchanged, thus it achieves the purpose of no voltage flickers for LED lamps.

In order to make the purpose, technical solution and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

Figure 1:
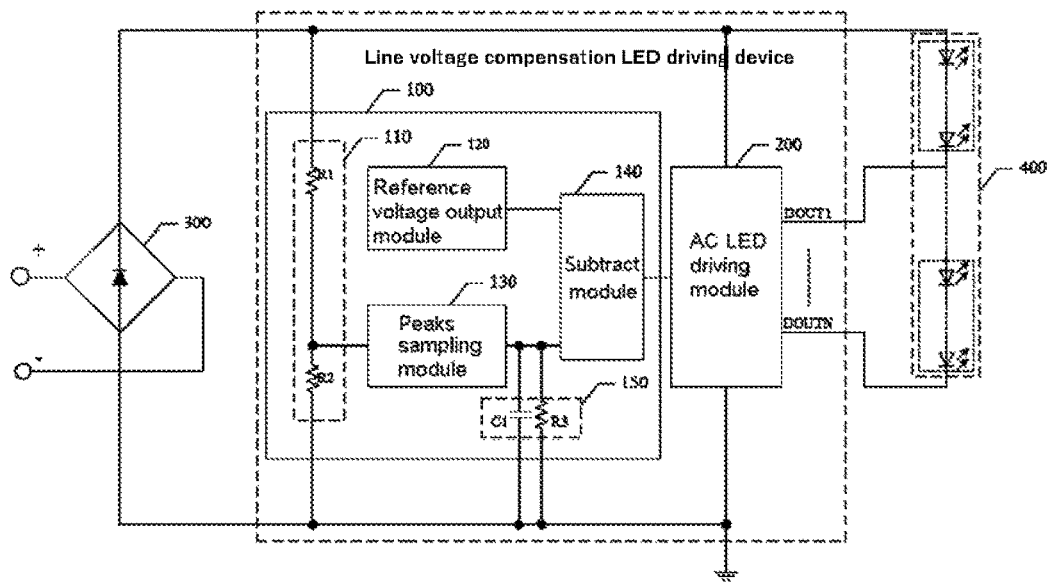
FIG. 1 illustrates a structural block diagram of a line voltage compensation AC LED driving device as described in one embodiment of the present invention.

Referencing to FIG. 1, which is a structural block diagram of a line voltage compensation AC LED driving device as described in one embodiment of the present invention. As shown in FIG. 1, the line voltage compensation AC LED driving device provided in one embodiment of the present invention connects in series between a rectifier bridge 300 and an LED lights group 400, including: a line voltage compensation module 100 and an AC LED driving module 200, the line voltage compensation module 100 connects the AC LED driving module 200 and the rectifier bridge 300, the AC LED driving module 200 connects to the rectifier bridge 300 and the LED lights group 400.

Wherein, the line voltage compensation module 100 is applied to detect an output voltage of the rectifier bridge 300 before outputting a corresponding line voltage compensation reference voltage to the AC LED driving module 200, according to the changes of the output voltage from the rectifier bridge 300; the AC LED driving module adjusts a driving current in a real time basis, according to the line voltage compensation reference voltage, and keeps the output power unchanged, therefore, keeps the luminance of LEDs in the LED lamps group almost unchanged. For example, in a case of any high-power electric devices being turned on or off, the voltage of supplied power may have small fluctuations in a short time, at this moment, the line voltage compensation module 100 may be able to detect the voltage variations of the supplied power, and generate a line voltage compensation reference voltage before supplying to the AC LED driving module 200, while the AC LED driving module 200 may adjust the driving current in a real time basis according to the line voltage compensation reference voltage, and keep the output power unchanged.

Continuing referencing to FIG. 1, the line voltage compensation module 100 includes specifically: a voltage divider module 110, a reference voltage output module 120, a peaks sampling module 130 and a subtract module 140. The line voltage compensation module 100 may be integrated into a chip, may also be integrated into a chip with the AC LED driving module 200.

The voltage divider module 110 connects to the rectifier bridge 300 and the input terminal of the peaks sampling module 130, applied to output a voltage to the peaks sampling module 130 after dividing the voltage output from the rectifier bridge 300. The output terminals of both the reference voltage output module 120 and the peaks sampling module 130 connect to the input end of the subtract module 140, while the output end of the subtract module 140 connects to the input end of the AC LED driving module 200. The peaks sampling module 130 is applied to output the data after voltage sampling to the subtract module 140, while the subtract module 140 is applied to execute subtract calculations between a sampled voltage output from the peaks sampling module 130 and a reference voltage output from the reference voltage output module 120, before outputting the line voltage compensation reference voltage to the AC LED driving module 200. In this case, the valid current value output from the AC LED driving module 200 changes following the peak value changes of the input supplied power, therefore, the output power of LED lamps group remains unchanged, in order to eliminate flickers of LED lamps.

In specific implementations, the voltage divider module 110 comprises a first resistor R1 and a second resistor R2, one end of the first resistor R1 connects to the rectifier bridge 300, and the other end connects to the peaks sampling module 130 and one end of the second resistor R2, while the other end of the second resistor R2 gets grounded. In the present embodiment, it is possible to adjust the slope of the line voltage compensation reference voltage to the supplied power voltage by adjusting the resistance ratio between the first resistor R1 and the second resistor R2, control the slope between the current passing through wicks of the LED lamps and the supplied power voltage, and make the line voltage compensation AC LED driving device be able to compensate the output power, which changes according to the changes of the supplied power.

In order to accurately collect samples of peak voltages in each voltage cycle, the driving device provided in the present invention further includes a charging/discharging module 150, applied to store peak voltages output from the peaks sampling module 130, and release the stored electric energy before the next rectifier cycle arriving, making it be able to store the peak voltages of the next rectifier cycle.

Specifically, the charging/discharging module 150 includes a first capacitor C1 and a third resistor R3, one end of the first capacitor C1 connects to the peaks sampling module 130 and the subtract module 140, while the other end gets grounded; the third resistor R3 connects to both ends of the first capacitor C1 in parallel.

In the present embodiment, the input supplied power is input into the peaks sampling module 130, after being voltage divided by the first resistor R1 and the second resistor R2, and the peaks sampling module 130 stores the peak voltages into the first capacitor C1, the third resistor R3 is a discharge resistor, which discharges the first capacitor C1, in order to refresh the charges stored in the first capacitor C1 before the next rectifier cycle coming, to avoid the voltage stored in the first capacitor C1 being too high to collect supplied power voltage samples normally when the next crest arrives. If there is no the third resistor R3, then when the peak voltage of the next rectifier cycle is smaller than that of the previous cycle, it will keep the peak voltage value of the previous cycle in the first capacitor C1, and that will cause voltage sampling error in the peaks sampling module 130, thus make the subtract module 140 not being able to output the line voltage compensation reference voltage correctly.

Further, in the above said line voltage compensation AC LED driving device, the line voltage compensation reference voltage output from the subtract module 140 is:

$$V2 = V1 - Vac \times \frac{R2}{R1 \times R2} \times K,$$

wherein, V1 is the reference voltage output from the reference voltage output module 120, Vac is the peak voltage of the AC supplied power, R1 is the resistance of the first resistor R1, R2 is the resistance of the second resistor R2, K is the discharge coefficient of the charging/discharging module 150, specifically, the discharge coefficient of the first capacitor C1.

In specific implementations, during two adjacent cycles, the average value in the first capacitor C1 is M times of the peak values of the rectifier output voltage, wherein, M is a number smaller than 1. For example, in a normal case, the voltage fluctuation of the supplied power is around ±10%, then it is needed to leave a certain margins to ensure the peaks sampling module 130 may respond to a 15% voltage fluctuation of the supplied power. Supposing a maximum value Tmax in an input supplied power cycle, then the time constant of the RC circuit composed by the third resistor R3 and the first capacitor C1 should be set as 0.52 Tmax. in such a case, the value of K should be taken as around 0.925.

Figure 2A:
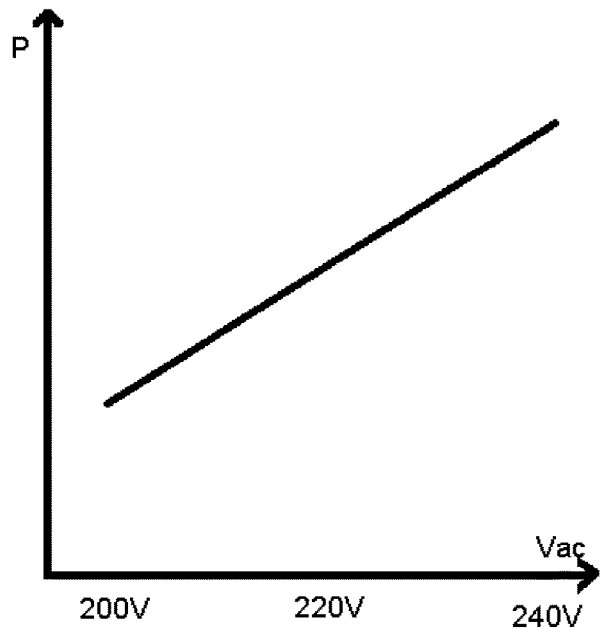
FIG. 2a illustrates a relationship diagram between the output power and the voltage of a conventional AC LED control circuit.
Figure 2B:
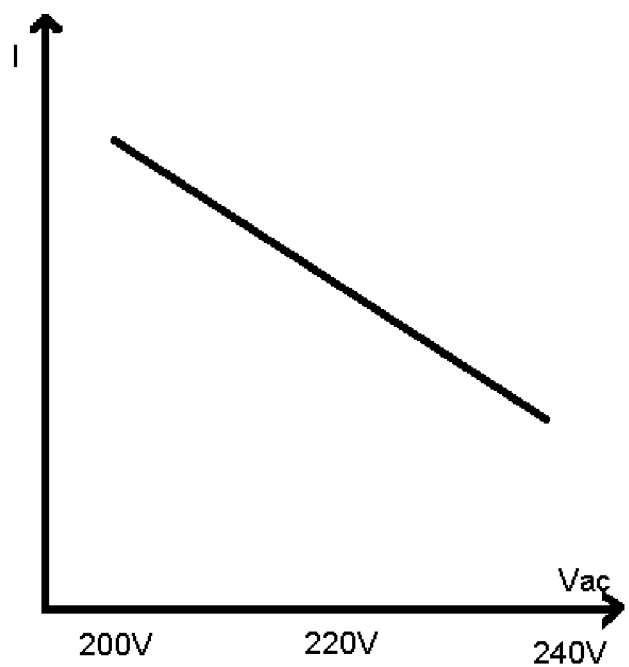
FIG. 2b illustrates a relationship diagram between the current and the voltage output from a line voltage compensation AC LED driving device as described in one embodiment of the present invention.
Figure 2C:
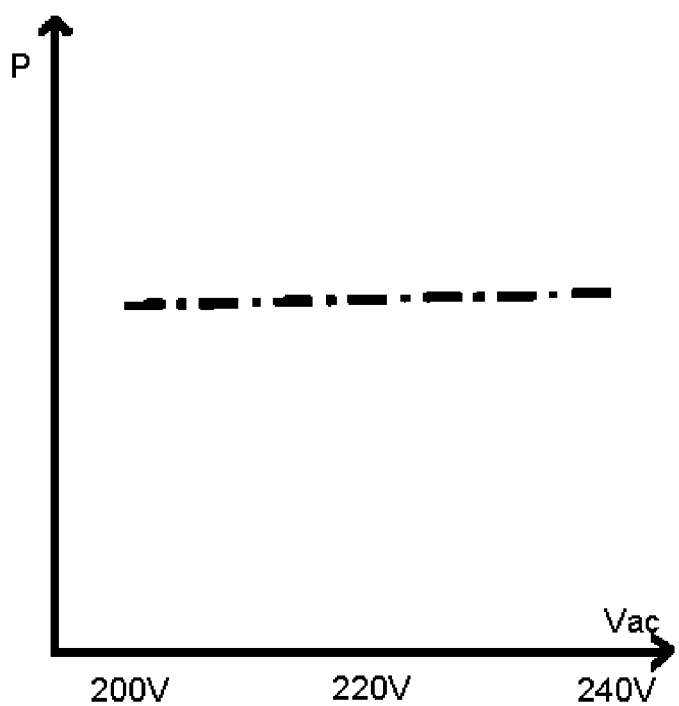
FIG. 2c illustrates a relationship diagram between the power and the voltage output from a line voltage compensation AC LED driving device as described in one embodiment of the present invention.

Further detailed descriptions of the line voltage compensation AC LED driving device as provided in the present invention are stated here, by comparing between the output power from a conventional AC LED driving chip and that after line voltage compensation as stated in the present invention, referencing to the attached drawings of FIGS. 2a-2c:

As shown in FIG. 2a, a conventional AC LED control circuit without adopting any line voltage compensation circuits, the output power may change in the same direction with the voltage fluctuations of the supplied power; in a certain supplied power voltage ranges, for example, in a supplied power voltage range of 200V~240V, the fluctuation slope of the output power according to the input voltage is fixed. Therefore, when the voltage of the supplied power fluctuates, the output power will also fluctuate, which makes the LED lamps flickering.

FIG. 2b is a relationship diagram between the current and the voltage output from the line voltage compensation AC LED driving device as described in one embodiment of the present invention. As shown in FIG. 2b, the driving device provided in the present invention may control the slope of the current in the LED wick to the supplied power voltage, therefore, it is possible to make the output current from the line voltage compensation AC LED driving device be able to compensate the changes of the output power according to the voltage variations of the supplied power, and make the output power of the line voltage compensation AC LED driving device keep almost unchanged in a certain voltage range, which ensures the luminous flux of the lamps almost unchanged, and achieves the effects of voltage flickers eliminations. After line voltage compensations by the line voltage compensation AC LED driving device, the output power of the AC LED driving module is shown in FIG. 2c.

The present embodiment may adjust the slope of the line voltage compensation reference voltage to the supplied power voltage through adjusting the ratio between the first resistor R1 and the second resistor R2, thus may control the slope of the current in the LED wick to the supplied power voltage, and make the driving current of the line voltage compensation AC LED be able to compensate the changes of the output power to the supplied power voltage, making the output power of the line voltage compensation AC LED driving device almost unchanged in a certain voltage range, which ensures the output luminous flux of a lamp basically unchanged, and achieves the effects of eliminating voltage flickers.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A line voltage compensation AC LED driving device, connected in series between a rectifier bridge and an LED lights group, comprising:
   a line voltage compensation module; and
   an AC LED driving module, wherein:
   the line voltage compensation module detects a voltage output from the rectifier bridge and outputs a corresponding line voltage compensation reference voltage to the AC LED driving module,
   the AC LED driving module adjusts a driving current in a real time basis according to the line voltage compensation reference voltage,
   the line voltage compensation module comprises a voltage divider module, a reference voltage output module, a peaks sampling module, a subtract module and a charging/discharging module, the voltage divider module includes a first resistor and a second resistor, and a slope of the line voltage compensation reference voltage to the voltage output from the rectifier bridge is adjusted through adjusting a ratio between the first resistor and the second resistor, and
   during two adjacent rectifier cycles, a voltage value on the charging/discharging module is M times of a peak value of the voltage output from the rectifier bridge, where M, which is a discharge coefficient of the charging/discharging module, is a number smaller than 1.

2. The line voltage compensation AC LED driving device according to claim 1, wherein:
   the voltage divider module outputs a voltage to the peaks sampling module after dividing the voltage output from the rectifier bridge, and
   the peaks sampling module takes voltage samples and outputs to the subtract module,
   the subtract module executes subtract calculations between a sampling voltage output from the peaks sampling module and a reference voltage output from the reference voltage output module and outputs the line voltage compensation reference voltage.

3. The line voltage compensation AC LED driving device according to claim 2, wherein:
   one end of the first resistor connects to the rectifier bridge,
   the other end of the first resistor connects to both the peaks sampling module and one end of the second resistor, and
   the other end of the second resistor gets grounded.

4. The line voltage compensation AC LED driving device according to claim 3, wherein:
   the charging/discharging module is configured to store the peak voltage output from the peaks sampling module and release a stored electric energy before the next rectifier cycle coming.

5. The line voltage compensation AC LED driving device according to claim 4, wherein:
   the charging/discharging module includes a first capacitor and a third resistor,
   one end of the first capacitor connects to both the peaks sampling module and the subtract module,
   the other end of the first capacitor gets grounded, and
   the third resistor connects to both ends of the first capacitor in parallel.

* * * * *